United States Patent
Parra Becerra

(10) Patent No.: US 9,610,887 B1
(45) Date of Patent: Apr. 4, 2017

(54) CARGO TIE-DOWN ASSEMBLY

(71) Applicant: FORD GLOBAL TECHNOLOGIES, LLC, Dearborn, MI (US)

(72) Inventor: Santiago Manuel Parra Becerra, Ocoyoacac (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/852,185

(22) Filed: Sep. 11, 2015

(51) Int. Cl.
*B60P 7/06* (2006.01)
*B60P 7/16* (2006.01)
*B60P 7/08* (2006.01)

(52) U.S. Cl.
CPC ............ *B60P 7/16* (2013.01); *B60P 7/0823* (2013.01)

(58) Field of Classification Search
CPC ............ B60P 7/06; B60P 7/08; B60P 7/0807
USPC .................... 410/101, 106, 107, 111, 112
See application file for complete search history.

(56) References Cited

U.S. PATENT DOCUMENTS

| | | | | | |
|---|---|---|---|---|---|
| 2,227,184 | A | * | 12/1940 | Goetz | A44C 1/00 63/1.16 |
| 3,244,803 | A | * | 4/1966 | Becker | F16L 3/1215 174/154 |
| 3,422,486 | A | * | 1/1969 | Thomas, Jr. | E05D 5/043 16/251 |
| 3,762,509 | A | * | 10/1973 | James | F16D 55/2262 188/73.1 |
| 3,782,509 | A | * | 1/1974 | Cook | F16D 55/2262 188/73.36 |
| 3,841,446 | A | * | 10/1974 | Gravel, Jr. | F16D 55/22 188/73.35 |
| 3,977,499 | A | * | 8/1976 | Johannesen | F16D 55/2262 188/73.36 |
| 3,998,296 | A | * | 12/1976 | James | F16D 55/2262 188/73.36 |
| 5,180,263 | A | | 1/1993 | Flowers, Jr. | |
| 6,065,917 | A | | 5/2000 | Shambeau et al. | |
| 6,213,696 | B1 | * | 4/2001 | Austin | B60N 2/2806 410/101 |
| 6,644,901 | B2 | | 11/2003 | Breckel | |
| 8,388,286 | B2 | | 3/2013 | Niklas et al. | |
| 2006/0180718 | A1 | * | 8/2006 | Harrison, Jr. | F16L 3/123 248/74.2 |
| 2008/0008560 | A1 | * | 1/2008 | Wakabayashi | B60R 16/0215 411/510 |
| 2015/0166146 | A1 | * | 6/2015 | Kutsen | B63B 21/22 114/210 |

FOREIGN PATENT DOCUMENTS

| | | | |
|---|---|---|---|
| JP | 2005221025 A | * | 8/2005 |
| JP | 2011202779 A | * | 10/2011 |

OTHER PUBLICATIONS http://dictionary.cambridge.org/dictionary/english/carry accessed and printed Jul. 8, 2016 Cambridge Dictionary.*

(Continued)

*Primary Examiner* — H Gutman
(74) *Attorney, Agent, or Firm* — Vichit Chea; King & Schickli, PLLC

(57) ABSTRACT

A cargo tie-down assembly is provided. The cargo tie-down assembly includes a base, a tie-down loop carried by the base, and a clip carried on the base. The clip engages a portion of the tie-down loop held in the base to limit free play and vibration of the tie-down loop with respect to the base.

14 Claims, 5 Drawing Sheets

(56) References Cited

OTHER PUBLICATIONS http://www.dictionary.com/browse/carrying accessed and printed Jul. 8, 2016 Dictionary.com.*
http://www.merriam-webster.com/dictionary/hold accessed and printed Jul. 8, 2016 Merriam-Webster's Online Dictionary.*

* cited by examiner

CARGO TIE-DOWN ASSEMBLY

TECHNICAL FIELD

This document relates generally to the motor vehicle equipment field and, more specifically, to a cargo tie-down assembly.

BACKGROUND

It has long been known to provide a storage area of a motor vehicle with tie-down loops adapted to receive strings, ropes, bungee cords or other fastening devices in order to hold transported items/cargo in position during motor vehicle operation, thereby preventing those items/cargo from shifting or rolling around and being damaged.

This document relates to a new and improved cargo tie-down assembly incorporating a clip that functions as an aesthetically pleasing cover and limits or eliminates free play of the tie-down loop when not in use, thereby better controlling operation and eliminating vibration and noise.

SUMMARY

In accordance with the purposes and benefits described herein, a cargo tie-down assembly is provided. That cargo tie-down assembly comprises a base, a tie-down loop carried by the base and a clip carried on the base. The clip engages the tie-down loop to limit free play and thereby eliminate vibration and noise.

In one possible embodiment, the clip includes a retention feature securing the clip to the base. Further, the clip includes a projection engaging the tie-down loop. That projection includes a grooved end. The grooved end includes a radiused groove that engages a radiused sidewall of the tie-down loop.

In one possible embodiment, the body has a cylindrical aperture for receiving a portion of the tie-down loop. Further, the body includes an opening communicating with that cylindrical aperture. The clip is carried over the body and the projection on the clip extends through the opening, engaging the portion of the tie-down loop received in the cylindrical aperture, thereby limiting the free play and vibration of the tie-down loop within the base. In one possible embodiment, the opening and the projection extend substantially perpendicular to the cylindrical aperture.

In one possible embodiment, the retention feature on the clip functions to secure the clip over the body. That retention feature may comprise two opposed resilient mounting lugs that snap over opposed edges of the base. In one possible embodiment, the clip also includes an arcuate section received over a sleeve-like portion of the base that forms the cylindrical aperture and the projection extends from an inside face of the arcuate section through the opening in the base. Still further, the base receives a fastener securing the cargo tie-down assembly to a cargo compartment wall of a motor vehicle.

In accordance with an additional aspect, a clip is provided for eliminating free play of the tie-down loop in a base. That clip comprises a body, a retention feature engaging the base and a projection engaging the tie-down loop held in the base. Still further, the body includes an arcuate section and the projection is provided on an inside face of the arcuate section. Further, the retention feature includes two opposed resilient mounting lugs that snap over opposed edges of the base. Still further, the clip projection includes a grooved end incorporating a radiused groove.

In the following description, there are shown and described several preferred embodiments of the cargo tie-down assembly and clip. As it should be realized, the cargo tie-down assembly and clip are capable of other, different embodiments and their several details are capable of modification in various, obvious aspects all without departing from the cargo tie-down assembly and clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo tie-down assembly and clip and together with the description serve to explain certain principles thereof. In the drawing figures.

Reference will now be made in detail to the present preferred embodiments of the cargo tie-down assembly and clip, examples of which are illustrated in the accompanying drawing figures.

DETAILED DESCRIPTION

Figure 1:
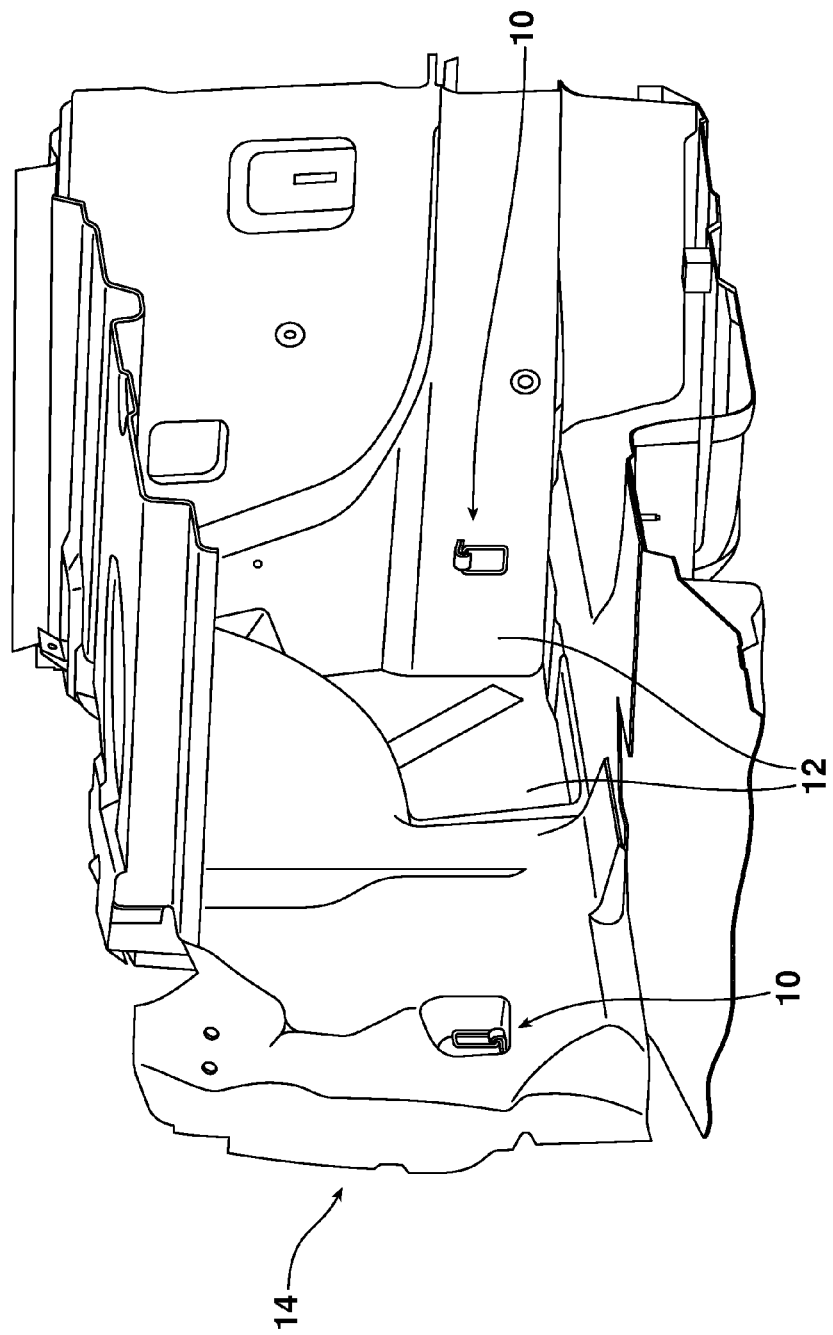
FIG. 1 is a perspective view of a portion of a cargo compartment of a motor vehicle illustrating two cargo tie-down assemblies mounted to a cargo compartment wall by means of fasteners and cooperating retention hooks.

Reference is now made to FIG. 1, illustrating two cargo tie-down assemblies 10 mounted on a cargo compartment wall 12 in a cargo compartment 14 of a motor vehicle. As best illustrated in FIGS. 2 and 3, each cargo tie-down assembly 10 includes a base 16, a tie-down loop 18 carried by the base 16 and a clip 20 carried on the base 16 and engaging the tie-down loop 18 to limit/eliminate free play and vibration of the tie-down loop 18 in the base 16.

Figure 2:
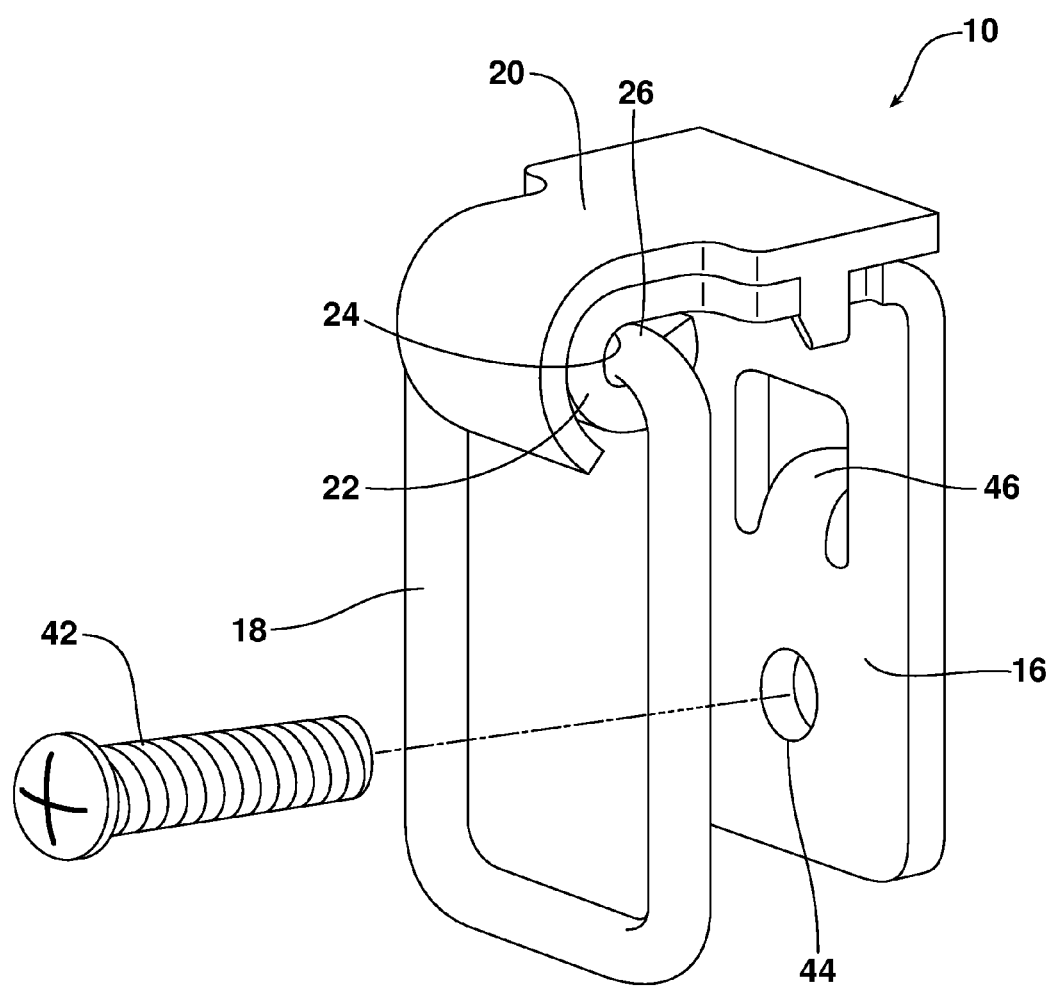
FIG. 2 is a detailed perspective view of a cargo tie-down assembly including a base, a tie-down loop and a clip.
Figure 3:
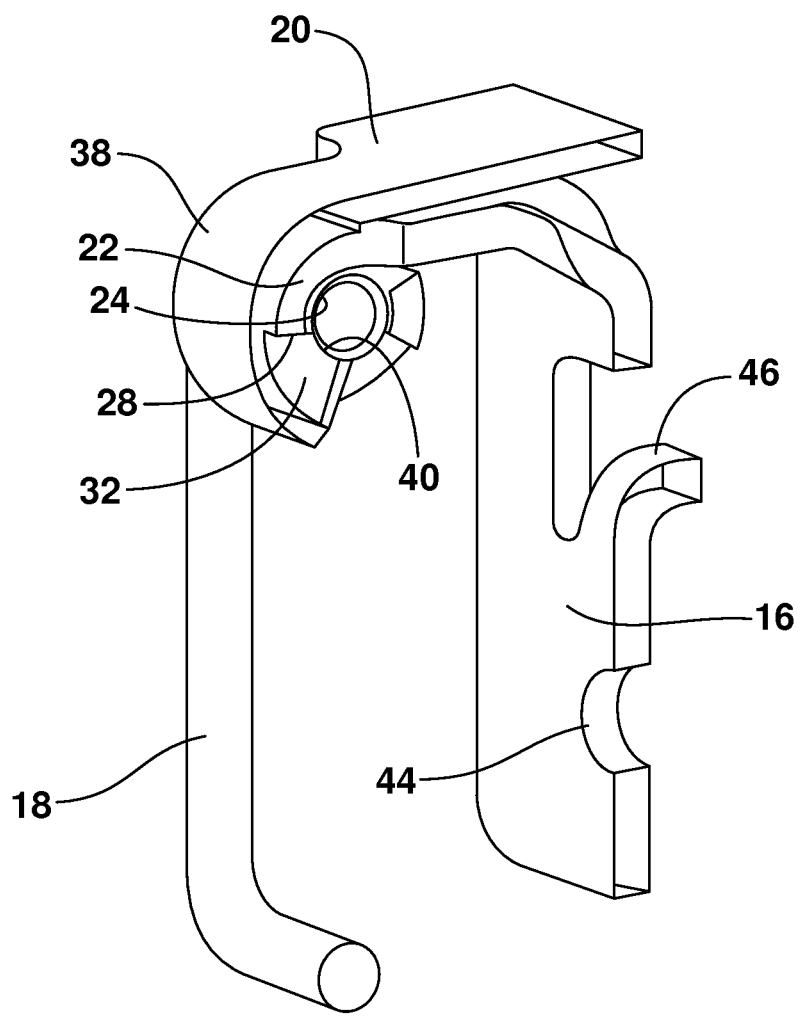
FIG. 3 is a perspective cross-sectional view of the cargo tie-down assembly illustrated in FIG. 2.

As illustrated in FIGS. 2 and 3, the base 16 includes a body having a sleeve portion 22 defining a cylindrical aperture 24. A portion 26 of the tie-down loop 18 is received and held in the cylindrical aperture 24. As best illustrated in FIG. 3, the sleeve portion 22 of the body also includes an opening 28 in communication with the cylindrical aperture 24. In the illustrated embodiment, the opening 28 extends substantially perpendicular to the cylindrical aperture 24.

As illustrated in FIGS. 2-5, the clip 20 includes a retention feature, generally designated by reference numeral 30, for securing the clip 20 to the base 16, and a projection 32, extending through the opening 28, to engage the portion 26 of the tie-down loop 18 received and held in the cylindrical aperture 24 of the base 16.

Figure 4:
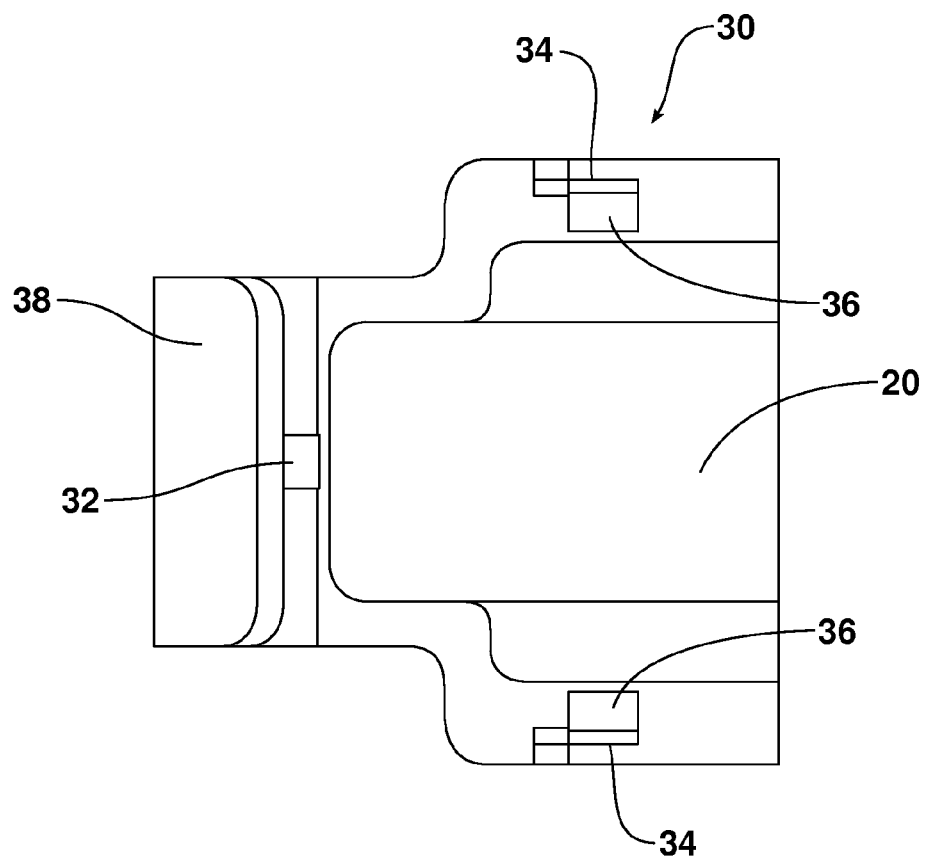
FIG. 4 is a bottom plan view of the clip that is attached to the base and includes a projection for limiting or eliminating free play of the tie-down loop in the base so as to control operation and eliminate rattle/noise of the tie-down loop in the base.
Figure 5:
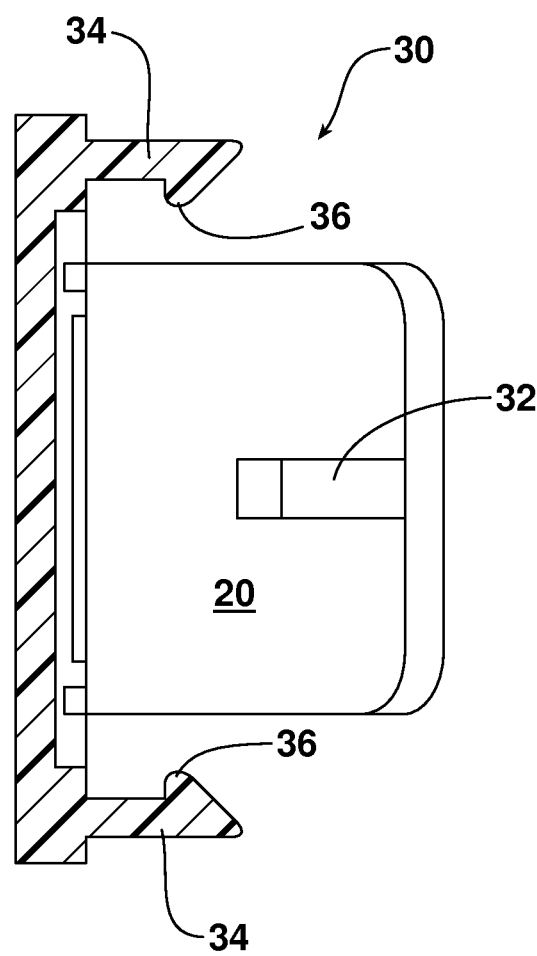
FIG. 5 is a cross-sectional view of the cover taken along line 5-5 of FIG. 4.

More specifically, as best illustrated in FIG. 4, the retention feature 30 comprises two opposed resilient mounting lugs 34. Each resilient mounting lug 34 includes an inwardly-directed locking rib 36. As best illustrated in FIG.

2, the clip 20 is positioned over the base 16 by aligning the projection 32 on the inside face of the arcuate section 38 with the opening 28 in the base 16. The arcuate section 38 is positioned over the sleeve portion 22 of the base 16 as the projection 32 is inserted into the opening 28. Simultaneously, the clip 20 is pushed downwardly on top of the base 16. The resilient mounting lugs 34 first spread to allow the passage of the locking ribs 36 over opposed edges of the base 16. Once the locking ribs 36 clear the base 16, the mounting lugs 34 snap back into position, securely locking the clip 20 onto the base 16 with a projection 32 engaging the portion 26 of the tie-down loop 18 held in the cylindrical aperture 24 of the base 16. It is the engagement of the grooved end 40 of the projection 32 with the side wall of the tie-down loop 18 that limits free play, vibration and rattle. As should be appreciated, the radius of the groove 40 substantially matches the radius of the portion 26. Thus, the groove 40 engages and receives the radiused sidewall of the tie-down loop 18 holding the tie-down loop against the base 16 and preventing it from rattling and vibrating in the base while allowing the tie-down loop to turn in the aperture 24 in the base so that the tie-down loop may be oriented as desired to tie down cargo.

The cargo tie-down assembly 10 is mounted to the cargo compartment wall 12 by means of a fastener 42, in the form of a pushpin, a screw or the like, that extends through the aperture 44 in the base 16 and engages in a cooperating aperture (not shown) in the wall of the cargo compartment 14. A cooperating mounting hook 46 on the base 16 and projecting rearwardly engages in a cooperating recess or aperture (not shown) in the cargo compartment wall 12. Together, the fastener 42 and mounting hook 46 provide a two point connection and function to prevent rotation of the cargo tie-down assembly 10 with respect to the cargo compartment wall 12.

The foregoing has been presented for purposes of illustration and description. It is not intended to be exhaustive or to limit the embodiments to the precise form disclosed. Obvious modifications and variations are possible in light of the above teachings. For example, the tie-down loop 18 may be circular, semicircular or assume substantially any other useful shape other than that illustrated in the drawing figures. Further, the base 16 may not include a mounting hook 46. Such a base would only be attached to the cargo compartment wall 12 by means of the fastener 42. Such an arrangement could be designed to allow the cargo tie-down assembly 10 to rotate about the fastener 42 with respect to the cargo compartment wall 12 if desired. All such modifications and variations are within the scope of the appended claims when interpreted in accordance with the breadth to which they are fairly, legally and equitably entitled.

What is claimed:

1. A cargo tie-down assembly, comprising:
a base;
a tie-down loop carried by said base; and
a clip carried on said base and engaging said tie-down loop to limit free play and vibration, wherein said clip includes a retention feature securing said clip to said base, wherein said clip includes a projection engaging said tie-down loop, and wherein said projection has a grooved end and said tie-down loop has a radiused sidewall.

2. The cargo tie-down assembly of claim 1, wherein said grooved end includes a radiused groove engaging said radiused sidewall.

3. A clip for eliminating free play of a tie-down loop in a base, comprising:
a body, wherein said body includes an arcuate section;
a retention feature engaging the base; and
a projection engaging the tie-down loop held in the base, wherein said projection is provided on an inside face of said arcuate section.

4. The clip of claim 3, wherein said retention feature includes two opposed resilient mounting lugs that snap over opposed edges of said base.

5. The clip of claim 3 wherein said projection includes an end with a radiused groove.

6. A cargo tie-down assembly, comprising:
a base including a body having a cylindrical aperture;
a tie-down loop carried by said base; and
a clip carried on said base and engaging said tie-down loop to limit free play and vibration,
wherein said cylindrical aperture receives a portion of said tie-down loop.

7. The cargo tie-down assembly of claim 6, wherein said body includes an opening communicating with said cylindrical aperture.

8. The cargo tie-down assembly of claim 7, wherein said clip is carried over said body.

9. The cargo tie-down assembly of claim 8, wherein said clip includes a projection extending through said opening and engaging said portion of said tie-down loop received in said cylindrical aperture.

10. The cargo tie-down assembly of claim 9, wherein said opening and said projection extend substantially perpendicular to said cylindrical aperture.

11. The cargo tie-down assembly of claim 9, wherein said clip further includes a retention feature securing said clip over said base.

12. The cargo tie-down assembly of claim 11, wherein said retention feature includes two opposed resilient mounting lugs that snap over opposed edges of said base.

13. The cargo tie-down assembly of claim 12, wherein said clip includes an arcuate section received over said cylindrical aperture and said projection extends from an inside face of said arcuate section.

14. The cargo tie-down assembly of claim 13, wherein said base received a fastener securing said cargo tie-down assembly to a cargo compartment wall of a motor vehicle.

* * * * *